Figure 1:
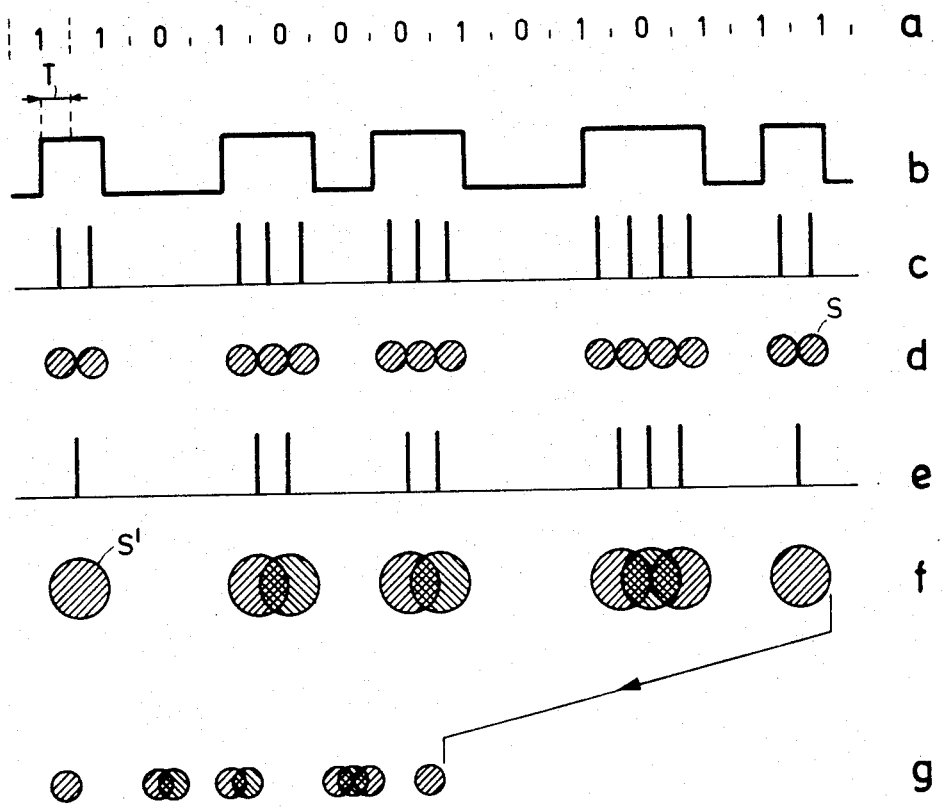

United States Patent [19]

Schouhamer Immink et al.

[11] Patent Number: 4,473,829
[45] Date of Patent: Sep. 25, 1984

[54] METHOD OF RECORDING A DIGITAL INFORMATION SIGNAL ON A RECORD CARRIER HAVING A RADIATION-SENSITIVE INFORMATION LAYER, APPARATUS FOR CARRYING OUT THE METHOD, AND OPTICAL RECORD CARRIER PROVIDED WITH SUCH A DIGITAL INFORMATION SIGNAL

[75] Inventors: Kornelis A. Schouhamer Immink; Ronaldus M. Aarts; Willem G. Opheij, all of Eindhoven, Netherlands

[73] Assignee: U.S. Philips Corporation, New York, N.Y.

[21] Appl. No.: 378,567

[22] Filed: May 17, 1982

[30] Foreign Application Priority Data

Apr. 2, 1982 [NL] Netherlands .................. 8201411

[51] Int. Cl.³ .................................... G01D 15/10
[52] U.S. Cl. .................................. 346/1.1; 346/76 L
[58] Field of Search .................... 346/1.1, 76 L, 108; 369/59; 360/40, 44; 375/110

[56] References Cited

U.S. PATENT DOCUMENTS 3,474,457 10/1969 Becker .............................. 346/76 L
4,027,335 5/1977 Miller ................................ 360/40
4,353,130 10/1982 Carasso et al. ................... 369/59

Primary Examiner—Joseph W. Hartary
Assistant Examiner—Todd E. DeBoer
Attorney, Agent, or Firm—Robert T. Mayer; Algy Tamoshunas

[57] ABSTRACT

A method of recording a binary information signal on a record carrier having a radiation-sensitive information layer. The information signal is encoded in such a way that at least n ($n \geq 2$) consecutive bit cells are of the same type. This information is recorded as pattern of unitary recording marks on the record carrier. Each unitary recording mark then corresponds to a number of m bit cells of the same first type in the information signal, where $1 < m \leq n$. A greater number of consecutive bit cells of said first type is represented by a plurality of unitary recording marks which are at least contiguous but which preferably overlap each other.

10 Claims, 12 Drawing Figures

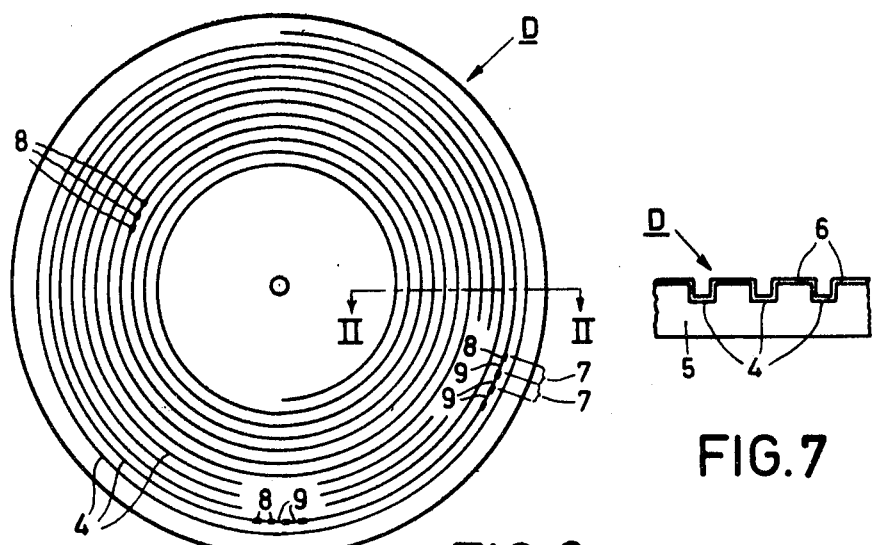
FIG. 7
FIG. 6a
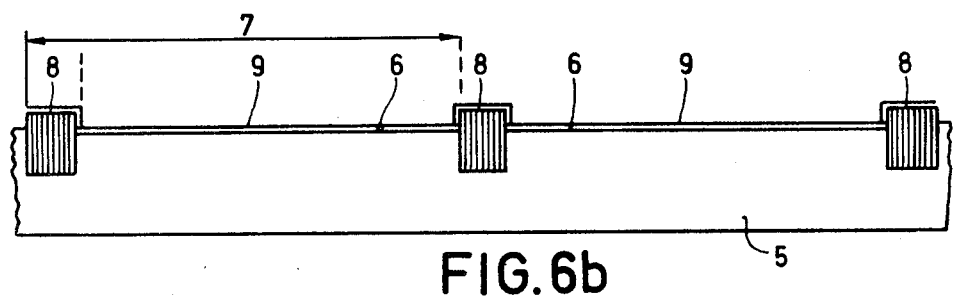
FIG. 6b
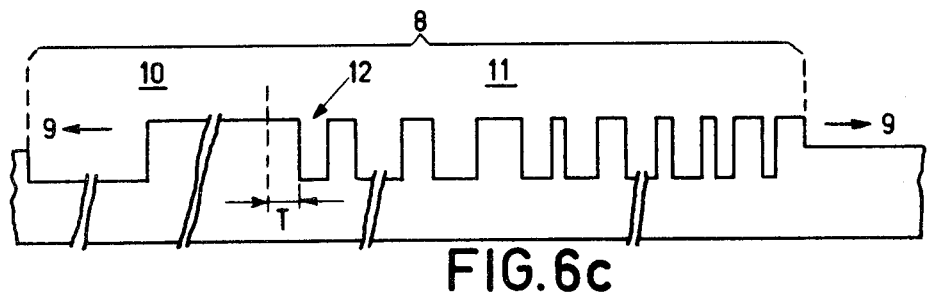
FIG. 6c

METHOD OF RECORDING A DIGITAL INFORMATION SIGNAL ON A RECORD CARRIER HAVING A RADIATION-SENSITIVE INFORMATION LAYER, APPARATUS FOR CARRYING OUT THE METHOD, AND OPTICAL RECORD CARRIER PROVIDED WITH SUCH A DIGITAL INFORMATION SIGNAL

The invention relates to a method of recording a binary information signal on a record carrier having a radiation-sensitive information layer. In such a method recording pattern corresponding to said information signal is formed in the information layer of the record carrier by the generation of radiation pulses of fixed duration and intensity at selected instants of the sequence of instants corresponding to the bit cells. The radiation pulses have an energy such that unitary recording marks are formed on the record carrier, with the information signal comprising a sequence of bit cells of which at least n consecutive bit cells are of the same first type, n being $\geq 2$.

The invention also relates to a record carrier provided with a digital information signal stored in an information track. The information signal comprises a sequence of bit cells, of which at least n consecutive bit cells are of the same type, a sequence of bit cells of a first type always being represented by a plurality of unitary recording marks in the information track.

The invention also relates to apparatus for carrying out the method, which apparatus comprises a radiation source, an optical system for focusing a radiation beam emitted by the radiation source onto a radiation-sensitive information layer of a record carrier, and a control device for controlling the radiation source depending on an applied binary information signal, which information signal comprises a sequence of bit cells, of which at least n consecutive bit cells are of the same type, n being $\geq 2$.

To date record carriers with radiation-sensitive information layers command much interest. This is mainly because such record carriers have a very high storage capacity, enabling a very large amount of information, for example data information and digitized video and-/or audio information, to be recorded on such record carriers.

The information layer of such a record carrier comprises a material which exhibits a physical reaction upon exposure to a radiation beam of suitable intensity, so that by modulating this recording beam a corresponding recording pattern is formed on the record carrier. The information layer may, for example, consist of a metal, inter alia tellurium, which locally melts by heating upon exposure to said radiation beam. Alternatively, this information layer may, for example, comprise a double-layer structure of materials which react chemically under the influence of the incident beam of radiation, for example, on ion or bismuth on tellurium. Other suitable materials are, for example, magneto-optical materials such as Gd-Fe and cobalt ferrites. In itself the material selected for the information layer is irrelevant to the present invention, provided that upon exposure to a modulated radiation beam a recording pattern corresponding to the information signal is formed in this material.

For an optimum use of the storage capacity of the record carrier the information signal is generally modulated in a special manner, i.e. the source coding of the information signal is converted into a channel coding, which channel coding is adapted to suit the specific properties of the channel, in the present case the record carrier.

Parameters which are important in this respect are inter alia:

(1) the maximum frequency of the recorded information signal in view of the limited transmission bandwidth of the record carrier and the recording and reproducing apparatus, (2) the low-frequency signal content of the information signal; this is in view of cross-talk between the information signal and the low-frequency servo signals which are frequently used in read apparatuses for optical record carriers for centering the read spot on the information track and for focusing this read spot, (3) the maximum number of consecutive bit cells of the same type; this is because it is frequently required that the clock information can be derived from the information signal during read-out of the record carrier.

Netherlands Patent Application No. 80 00 121 which corresponds to U.S. application Ser. No. 134,392, filed Mar. 26, 1980 describes a method of the type mentioned in the opening paragraph and also describes some channel codings. Furthermore, said Patent Application describes two methods of recording the information signal on the record carrier in accordance with the channel coding.

In accordance with the first method a light beam is modulated exactly in accordance with the digital signal, so that recording marks of variable length are recorded on the record carrier, which marks correspond to the periods that the information signal assumes one of the digital values.

In accordance with the second method the light beam is pulsed, that is, for each bit cell of one type in the information signal a radiation pulse of fixed length and magnitude is generated. On the record carriers these radiation pulses produce recording marks of constant dimensions, unitary recording marks, each unitary recording mark consequently representing a bit cell of one specific type. In comparison with the first method this second method has the advantage that the dissipation in the radiation source is smaller, which has also a favourable effect on the lifetime of the radiation source.

Furthermore, said Netherlands patent application describes a channel coding in which at least two consecutive bit cells are always of the same type. As the minimum number of consecutive bit cells of the same type, i.e. n, increases, the maximum frequency of the binary information signal decreases. It is obvious that this has a favourable effect on the attainable storage capacity and the required bandwidth of the recording and reproducing apparatus.

It is an object of the invention to provide a method of the type mentioned in the opening paragraph which enables a very high information density on the record carrier to be achieved without the need to impose extremely stringent requirements on the recording equipment and which also enables the dissipation of the radiation source to be reduced even further.

To this end the invention is characterized in that the radiation pulses are dimensioned so that the unitary recording marks formed by said radiation pulses represent m consecutive bit cells of the same first type, for which $1 < m \leq n$ (m and n being integers), and in that a greater number of consecutive bit cells of the same first type is represented by a plurality of unitary recording marks which are at least contiguous and which are produced by a plurality of consecutive radiation pulses.

The invention is based on the recognition of the fact that in practice the minimum size of the unitary recording marks is subject to limits. This depends on material parameters of the information layer and on the properties of the optical components by which the radiation beam in the recording apparatus is focused onto the information layer. If in encoding systems in which the number of consecutive bit cells of the same type is greater than one bit cell, said unitary recording mark is not related to one bit cell but to m bit cells, for which $1 < m \leq n$, the storage capacity of the record carrier can be increased substantially. The increase obtained by means of the invention then depends on the value of m. A preferred embodiment of the method in accordance with the invention is characterized in that $m = n$. This provides a maximum increase in storage capacity.

A record carrier in accordance with the present invention is characterized in that one unitary recording mark represents m consecutive bit cells of the first type, for which $1 < m \leq n$ (m and n being integers), and in that a greater number of consecutive bit cells of said first type is represented by a plurality of unitary recording marks which are at least contiguous.

Finally, a recording apparatus in accordance with the invention is characterized in that the control device is adapted to supply control pulses to the radiation source and said radiation source is adapted to produce such a radiation pulse, in response to a control pulse that on the record carrier a unitary recording mark is formed which corresponds to m consecutive bit cells of the same first type in the information signal, for which $1 < m \leq n$.

Figure 2:
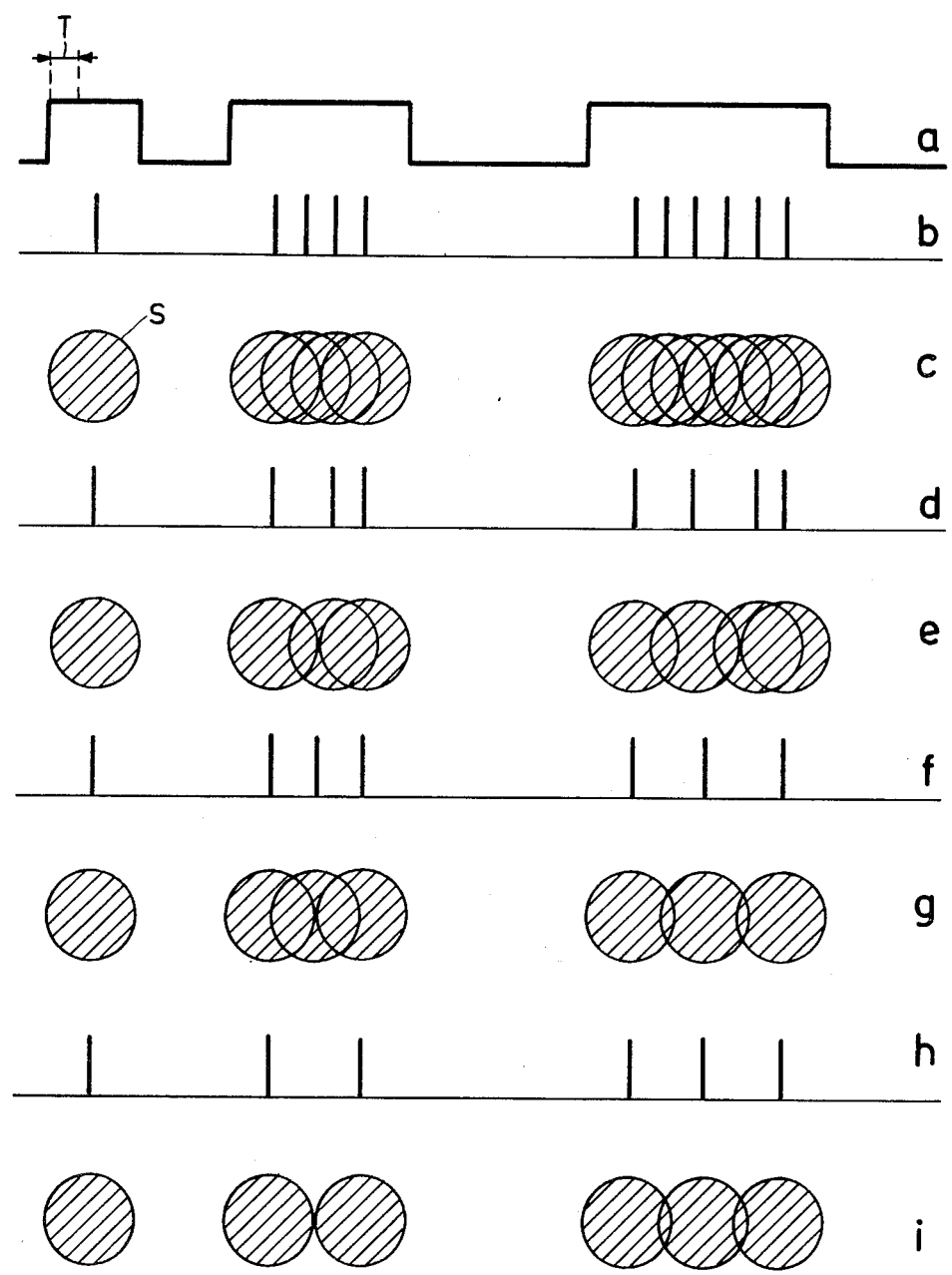
Figure 3:
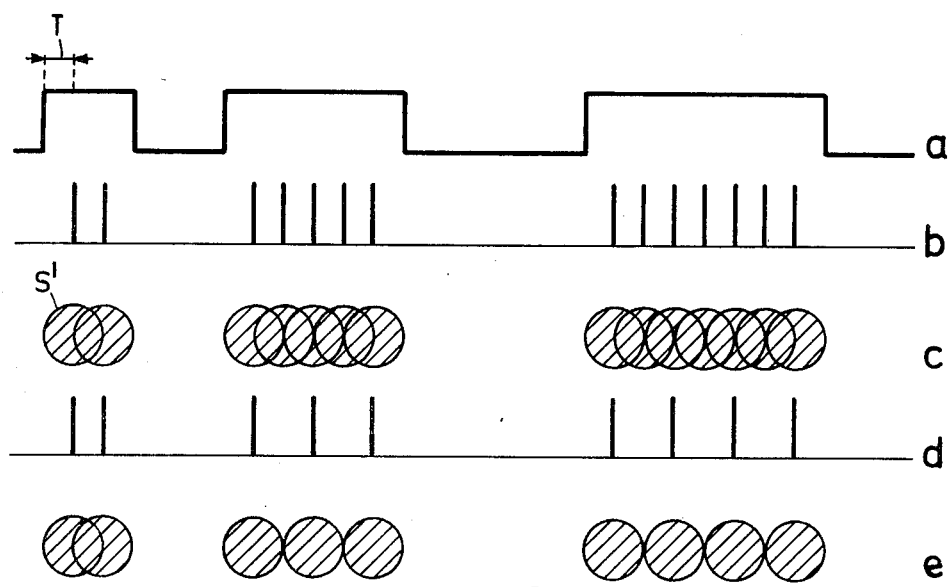
Figure 4:
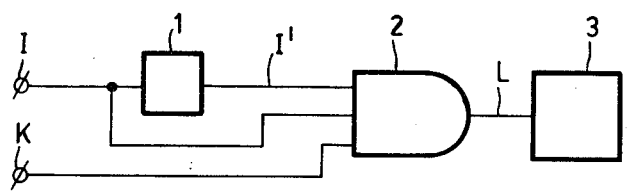
Figure 5:
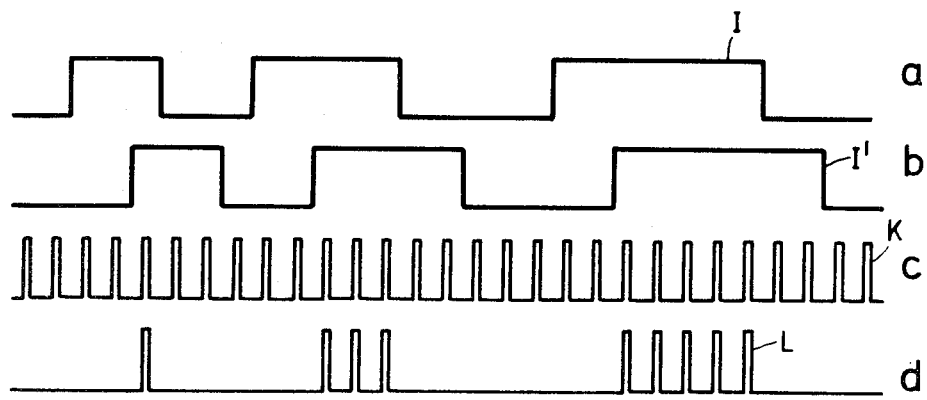
Figure 8A:
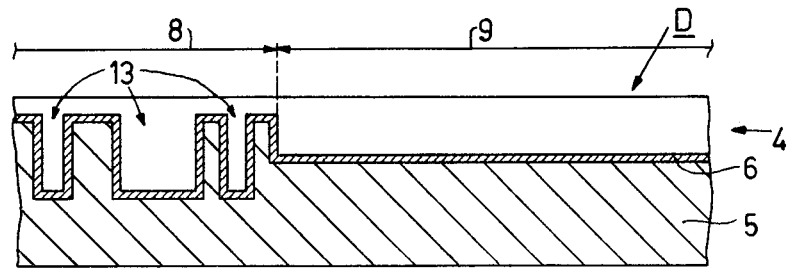
Figure 8B:
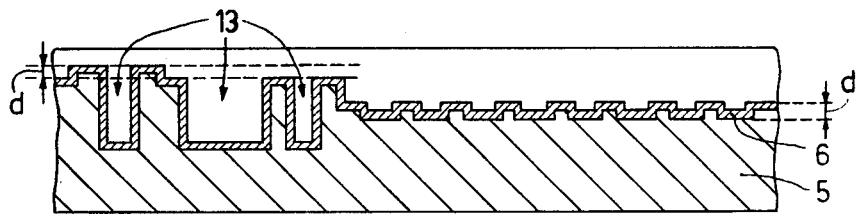
Figure 9:
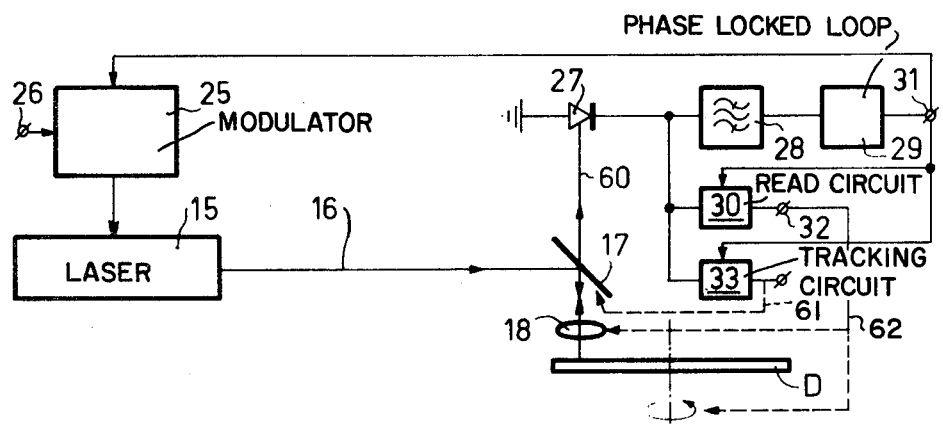

The invention will now be described in more detail with reference to the drawing, in which FIGS. 1, 2 and 3 represent signal waveforms and the associated recording marks to illustrate the method in accordance with the invention, FIG. 4 shows an example of a device for obtaining the radiation pulses required for the method in accordance with the invention, FIG. 5 shows the signal waveforms appearing in said device, FIG. 6a shows a record carrier on which information may be recoded in accordance with the invention, FIG. 6b, 6c, 7, 8a and 8b show details of the record of FIG. 6a at an enlarged scale, and FIG. 9 shows an apparatus for recording information on a record carrier.

FIG. 1 schematically represents a first version of the method in accordance with the invention, using the so-called Miller modulation.

FIG. 1a represents a bit sequence of a digital signal, comprising a sequence of logic zeros and ones. In accordance with the Miller modulation this digital signal is converted into a binary information signal as shown in FIG. 1b.

In accordance with the Miller modulation the binary information signal then exhibits a transition halfway a logic "1" of the applied digital signal and transition between two consecutive "0"'s of this signal.

A characteristic feature of this Miller modulation is that the length of time in which the binary signal continuously has one of the two values can assume only a specific number of discrete values, which values comply with the formula nT. T is the greatest common divisor of these possible discrete values and in the Miller modulation it corresponds to half the bit length of the original digital signal. In this Miller modulation the paramater n may assume the value 2, 3 or 4, as will be apparent from the Figure. Hereinafter the time interval T will be referred to as bit cell, as is customary.

For recording the binary information signal on a record carrier having a radiation-sensitive layer a radiation beam must be modulated in such a way that on this record carrier recording marks are formed whose sequence represents the binary information signal. For this purpose this radiation beam may, of course, be modulated directly with the binary information signal to be recorded. In addition, the said Netherlands patent application No. 80 00 121 (U.S. application Ser. No. 134,392) describes the possibility of recording unitary recording marks on the record carrier by the pulsed operation of the radiation source. For this purpose a radiation pulse as shown in FIG. 1c is generated for each bit cell T, which represents a logic "1". Each of the radiation pulses has a sufficiently high energy to produce a unitary recording mark corresponding to one bit cell on the record carrier. Thus, a pattern of recording marks S (shown in FIG. 1d) of fixed dimensions is formed on said record carrier, which marks are referred to as unitary recording marks and whose pattern represents the binary information signal.

In practice, the dimensions of these unitary recording marks, in general the diameter of the round marks, is subject to a minimum limit. This minimum depends on the parameters of the radiation-sensitive material and on the properties of the optical components used for recording. If the radiation-sensitive material is, for example, a material which melts upon exposure to a radiation beam of sufficient intensity, a specific minimum radiation energy will be required because of the reliability of the write process, which radiation energy forms a unitary recording mark of specific dimensions via heating of the material. If even smaller unitary recording marks are required the recording process will become unreliable. The optical components employed in the recording apparatus inter alia determine the diameter of the write spot projected onto the information layer. This write spot can be given a very small diameter by focusing, which results in the high storage capacity of these optical record carriers, but in practice this is also subject to limits. Indeed, regardless of, for example, flatness defects of the information layer this write spot diameter must always be maintained, which inter alia imposes stringent requirements on the flatness of the information layer and the focusing control of the recording apparatus.

Moreover, it should be borne in mind that even if unitary recording marks of very small dimensions can be formed on the record carrier by means of sophisticated techniques, this also has consequences for the read apparatus with which this record carrier is to be read. The read apparatus should then be capable of reliably reading these unitary recording marks, which imposes very stringent requirements on the optical components and control systems used therein, for example the tracking system and the focusing system. Especially if this read apparatus is a consumer product, for example for reading digital video and/or audio information, the requirements that may be imposed are subject to limits.

As a result of this the diameter of the unitary recording marks S shown in FIG. 1d is limited to specific minimum dimensions in practice. This diameter in conjunction with the modulation system then determines the storage capacity of the record carrier.

The present invention aims at increasing this storage capacity in a simple manner. Instead of recording unitary recording marks which correspond to one bit cell it is proposed, in accordance with the invention, to record unitary recording marks which correspond to m consecutive bit cells of the same type in the binary information signal, for which $1 < m \leq n$. As already stated, $n = 2$ in the case of Miller modulation, so that in accordance with the invention it follows automatically that for this modulation system $m = n = 2$ and consequently one unitary recording mark S' corresponds to two bit cells. Moreover, in accordance with the invention, a greater number of consecutive bit cells of the same type are represented by a plurality of unitary recording marks which are at least contiguous.

When the method in accordance with the invention is applied to the binary information signal represented by FIG. 1b, this yields for example the pattern of unitary recording marks shown in FIG. 1f, for which radiation pulses as shown in FIG. 1e are required. Comparing the patterns of unitary recording marks shown in FIG. 1d and 1f then shows for example that the first two unitary recording marks S of FIG. 1d are replaced by single unitary recording marks S' in FIG. 1f, that the next three consecutive unitary recording marks of FIG. 1d are replaced by two partly overlapping unitary recording marks S' as shown in FIG. 1f, etc.

The dimensions of the unitary recording marks shown in FIG. 1f are selected so that a direct comparison with the pattern shown in FIG. 1d is possible. In reality the unitary recording mark S' will be selected to be identical to the marks S of FIG. 1d. The pattern shown in FIG. 1f is then reduced to the pattern shown in FIG. 1g, from which it is evident that the method in accordance with the invention leads to an increase in the storage capacity of the record carrier by a factor 2.

In addition to the Miller coding described in the foregoing several other codes exist in which the minimum number of consecutive bit cells of the same type is greater than one. These codes include serial codes (amongst them the Miller code) in which data bits of the digital source signal are consecutively transformed into bit cells of the binary information signal and so-called block codes, in which words of the digital signal are converted into an unambiguous pattern of bit cells of the binary information signal. An example of such a code is the so-called EFM (Eight to Fourteen Modulation), described in Netherlands patent application No. 80 04 028, which code is employed as a modulation for recording audio information on an optical disc in the so-called Compact Disc Audio System. In the case of this EFM modulation the resulting binary information signal is characterized in that at least 3 consecutive bit cells are of the same type ($n = 3$), whilst the maximum is 11. A number of alternatives to the method in accordance with the invention will be described with reference to FIG. 2 which represents a signal obtained by means of this EFM modulation.

FIG. 2a represents the binary signal. The radiation pulse used for recording is such that a unitary recording mark S is obtained which corresponds to 3 bit cells, the minimum number of consecutive bit cells of type "1", i.e. $m = n = 3$. A greater number of bit cells of type "1" can be recorded in the same way as illustrated by FIG. 1 by means of a number of consecutive radiation pulses spaced at time intervals of one bit cell, which results in the pattern shown in FIG. 2c, generated by the radiation pulses shown in FIG. 2b. The Figure shows that this results in a substantial overlap of the unitary recording marks.

In the pattern of radiation pulses shown in FIG. 2d every second radiation pulse of the sequence, by means of which a plurality of consecutive bit cells of type "1" should be recorded, is suppressed, except for the last radiation pulse of such a sequence. From the pattern of unitary recording marks corresponding to these radiation pulses, shown in FIG. 2c, it appears that this pattern still unambiguously represents the binary signal. The advantage thus obtained is of course that the dissipation of radiation source is reduced.

In addition to the first and the last radiation pulse whose presence and position are compulsory the pattern of radiation pulses shown in FIG. 2f, only comprises the minimum number of intermediate radiation pulses in order to obtain a sequence of partly overlapping unitary recording marks (FIG. 2g), which is achieved by positioning the intermediate radiation pulses at equal time intervals relative to the first and the last radiation pulse.

Finally, in the pattern of unitary recording marks shown in FIG. 2i, a sequence of consecutive bit cells of type "1" may be represented by a plurality of non-overlapping but contiguous unitary recording marks, so that the required number of radiation pulses (FIG. 2h) is reduced even further.

It will be evident that by means of logic circuitry the desired pattern of radiation pulses can be derived from the binary information signal in a simple manner. Apart from the said dissipation the choice of this pattern of radiation pulses also depends on the desired reliability. When the number of unitary recording marks is reduced this will ultimately also lead to a reduction of the reliability.

FIG. 3 represents an alternative to the method represented in FIG. 2. FIG. 3a again represents the binary signal shown in FIG. 2a. However, in contradistinction to the situation of FIG. 2, the unitary recording marks S now correspond to two bit cells, hence $m = 2$. The sequence of radiation pulses shown in FIG. 3b then results in a pattern of unitary recording marks S' as shown in FIG. 3c. This alternative method also allows a number of radiation pulses to be suppressed, for example every second radiation pulse (except the last one) of each sequence, which results in the sequence of radiation pulses shown in FIG. 3d and the pattern of unitary recording marks shown in FIG. 3e.

FIG. 4 by way of example shows a logic circuit for deriving the radiation pulses from the binary information signal, whilst FIGS. 5a to 5d show the corresponding signals.

This example is based on a binary information signal I in which at least 3 consecutive bit cells are of the same type, so that unitary recording marks which correspond to 3 bit cells can be recorded.

In the logic circuit shown in FIG. 4 the binary information signal I (FIG. 5a) is applied to a device 1 in which this information signal is delayed by two bit cells (FIG. 5a). The delayed information signal I' and the information signal I are applied to two inputs of an AND-gate 2. A third input of this AND-gate 2 receives a clock signal k (FIG. 5c) comprising pulses halfway every bit cell. At the output of this AND-gate 2 this yields the pulse train shown in FIG. 5d, which pulse train is applied to a radiation source 3. This radiation source 3 then produces radiation pulses for forming a unitary recording mark corresponding to 3 bit cells on the record carrier.

The optical components and the control systems, such as a focusing control system, used in this recording apparatus are of minor importance to the present invention. The same applies to the organisation structure on the record carrier, for example the presence of absence of a pre-recorded track on this record carrier. For example, the record carrier and the recording apparatus described in Netherlands patent application No. 80 00 121 (U.S. patent application Ser. No. 134,392) may be used to record the binary information signal in accordance with the invention. The record carrier and recording apparatus described in said application is shown in FIGS. 6 to 9.

FIG. 6(a) shows a possible embodiment of a record carrier to which the inventive principle may be applied, FIG. 6b showing a part of a track 4 of said record carrier on an enlarged scale, and FIG. 6c showing a synchronization area of said part on an enlarged scale. The record carrier body D is provided with a spiral track 4. This track 4 is divided into a multitude of sectors 7, for example 128 per revolution. Each sector 7 comprises an information area 9, intended for recording digitally coded information, and a synchronization area 8.

In order to ensure that the digital information is recorded in an accurately defined path the track 4 is employed as servo track. For this purpose the information areas 9 of the sectors 7 exhibit an amplitude structure, as is shown in FIG. 7. This FIG. 7 shows a small part of the cross-section taken on the line II—II′ in FIG. 6a and thus shows a number of adjacent track portions, specifically information areas, of the servo track 4. The direction of the servo tracks 4 is thus perpendicular to the plane of drawing. Said servo tracks 4, in particular the information areas 9, thus take the form of grooves in the substrate 5. In this way it is possible to make a radiation beam, which is directed at the record carrier in order to record digital information, accurately coincide with said servo track 4, in other words to control the position of the radiation beam in a radial direction via a servo system which employs light reflected by the record carrier. The measurement of the radial position of the radiation spot on the record carrier may be in accordance systems similar to those employed in optical record carriers provided with a video signal and as inter alia described in "I.E.E.E. Transactions on consumer electronics", November 1976, page 307.

For the recording of digital information the record carrier body is provided with a layer of a material 6 which, if exposed to suitable radiation, is subject to an optically detectable change. In principle only the information portions 9 of the sectors need be provided with such a layer. However, for reasons of manufacturing technology it is simpler to provide the entire record carrier surface with such a layer. This layer 6 may for example comprise a thin layer of a metal such as tellurium. This metal layer can be melted locally by laser radiation of sufficiently high intensity, so that locally this information layer 6 is given a different reflection coefficient, as a result of which the reflected radiation beam is amplitude-modulated in accordance with the recorded information when an information track thus inscribed is scanned by a read beam.

Alternatively, the layer 6 may take form of a double layer of materials, for example aluminium on iron, which react chemically to incident radiation. At the location where a high-power radiation beam in incident on the disc $FeAl_6$ is formed, which is a poor reflector. A similar effect is obtained in the case of a double layer of bismuth on tellurium, $Bi_2Te_3$ being formed. It is also possible to employ a single layer of tellurium.

As with the aid of the servo track in the form of a groove in the substrate 5 the write radiation spot is made to coincide accurately with said servo track, in particular when an information area is being scanned, the digital information modulating the write beam is exactly recorded in the information area coinciding with said servo track.

As is apparent from the foregoing the record carriers intended for the user, in which the information areas do not yet contain information, have a groove structure in said information areas within the sectors. Moreover, within each sector such a record carrier has a synchronization area 8 in the form of an optically detectable relief structure. FIG. 6b on an enlarged scale shows a part of a track 4, from which the sequence of a number of inforation areas 9 and synchronization areas 8 is apparent. In this case the synchronization areas 8 comprise a relief structure constituted by a sequence of recesses alternating with intermediate areas.

The depth of the recesses in this structure of the synchronization area is greater than he depth of the servo track in the information area 9. This depth of the recesses is selected in accordance with general optical rules and depending on the shape of said recesses in the selected read system in such way that an optimum read-out of the information represented by the structure is obtained. In the case of a read system in which the radiation beam reflected by the record carrier is detected by a single photo-detector, $\frac{1}{4}\lambda$ may be selected as depth for the recesses, $\lambda$ being the wavelength of the radiation used. If for the depth of the servo track in the information area 9 the value of $\frac{1}{8}\lambda$ or less is selected, this servo track will hardly affect the amount of light detected by the detector.

In order to further illustrate the structure of the synchronization area, FIG. 6c again shows such a synchronization area on an enlarged scale, the information layer 6 being omitted for the sake of simplicity. Such a synchronization area 8 comprises two portions, namely an indication portion 10 and an address portion 11. The address portion 11 contains all the information required for controlling the recording process. When recording digital information, this information is converted into a so-called word-organized bit series. This address portion contains information about the word organization, so that during recording the location of the bit words is defined and during reading the bit words are suitably decoded. Furthermore, this address portion 11 contains information about the relevant track number. This information takes the form of a relief structure in accordance with a digital modulation technique suitable for the recording medium. As, in addition to he servo track in the form of a groove in the information portions 9, the record carrier therefore in the synchronization area already contains all the information required for positioning information in the form of a bit-word-organized bit series in said information areas, the requirements imposed on the write and read apparatus employed by the user may be less stringent. As furthermore this fully prerecorded information is formed in the record carrier as a relief structure, said record carrier is particularly suitable for mass-production, enabling the customary pressing techniques to be used.

FIGS. 8a and 8b schematically represent two alternative embodiments of such a servo track 4 in a cross-section in the longitudinal direction of said servo tracks 4 with a part of the synchronization area 8 and a part of the information area 9. FIG. 8a showing such a cross-section of a blank prepared disc. The prepared dics is provided with a servo track 4, formed in a substrate 5, for example by means of a laser beam. By modulating the intensity of the laser beam it is then possible to form a relief structure of "pits" 13 containing information in the synchronization area 8. Subsequently, the entire disc, including for the sake of simplicity the portion of the record carrier D outside the grooves 4 may then be coated with the reflecting information layer 6. In the record carrier thus prepared information can be recorded in the information area 9 by forming holes in the reflecting information layer 6, for example by means of a laser beam.

FIG. 8b shows a cross-section of a blank prepared disc provided with clock information or signal of frequency fo. As disclosed in Netherlands patent application 8000121 (U.S. application Ser. No. 134,392) the clock information is used to synchronize the recording operation.

A recording apparatus for a disc as shown in FIG. 8b is show in FIG. 9. This Figure schematically represents an apparatus for providing the prepared disc with information and simultaneously reading the clock modulation structure. This apparatus comprises a laser 15 whose beam 16, via a semitransparent mirror 17 and a focussing optic 18, is projected onto the disc D. A reflected beam 30 is detected by means of a cell 27, for example a photodiode, and converted into an electric signal form which by means of the band-pass filter 28 the component of the frequency fo is extracted, which component is mainly produced by the clock modulation structure formed in the track 4. As the case may be, this signal may also be applied to a phase-locked loop 29, which improves the filtration, which increases the constancy of the clock signal and, as the case may be, compensates for brief signal dropouts. The clock signal is then available on output 31. Data can be recorded by pulse modulation of the laser beam 16, directly by including a modulator in the beam or, as is shown in FIG. 6b, by modulating the laser 15 itself with a write modulator circuit 25, to which the information is applied via an input 26 and which is synchronized with the clock signal on output 31.

Via the light-sensitive element 27 and a read circuit 30 the information contained in the synchronization portions is recovered from the reflected beam 60, which information appears on an output 32. This read circuit 30 may also be synchronized with the clock signal on output 31. Said information may be used to synchronize the circuit 25 and to locate the correct position on the disc. This information is also used in a servo control, not shown in FIG. 9, for radially positioning the optic 18 and the mirror 17, for inscribing the desired protion of the track 4 and for controlling the drive of the disc D, which is symbolically represented by the dashed line 62 in FIG. 9.

Furthermore, the apparatus may be provided with a tracking circuit 33 which derives a tracking signal from the signal supplied by the detector 27 in order to keep the beam 16 on the track 4 by controlling the angle relative to the beam 16 of the mirror 17, which is symbolized by the dashed line 61.

What is claimed is:

1. A record carrier provided with a digital information signal stored in an information track, which information signal comprises a sequence of bit cells, of which at least n (n≧2) consecutive bit cells are of the same type, a sequence of bit cells of a first type always being represented by a plurality of unitary recording marks in the information track, characterized in that one unitary recording mark represents m consecutive bit cells of the first type, for which 1<m≦n (m and n being integers) and a greater number of consecutive bit cells of said first type is represented by a plurality of unitary recording marks which are at least contiguous.

2. A record carrier as claimed in claim 1, characterized in that one unitary recording mark represents n consecutive bit cells of the first type and a plurality of consecutive bit cells of the first type greater than n is represented by a plurality of partly overlapping unitary recording marks.

3. A record carrier as claimed in claim 2, characterized in that the overlap of the partly overlapping unitary recording marks corresponding to n−1 bit cells.

4. In a method of recording a binary signal comprising a sequence of bit cells with at least n consecutive bit cells of said sequence being of the same first type, on a record carrier having a radiation-sensitive layer, the signal being recorded by directing radiation pulses produced by a radiation source onto the information layer so as to form a recording pattern thereon corresponding to the information signal, the improvement comprising controlling the radiation source in dependence on the information signal so as to produce in response to a sequence of m consecutive bit cells of said first type, a pulse of a duration and intensity such as to form in the information layer a unitary recording mark of a given configuration representing said sequence of m consecutive cells, and to produce in response to a sequence having a number of consecutive bit cells of said first type greater than m, a plurality of consecutive pulses such as to form in the information layer a plurality of said unitary recording marks which are at least contiguous, wherein n and m are integers, n≧2 and 1<m≦n.

5. The method according to claim 4 wherein m is equal to n.

6. The method according to claims 4 or 5 wherein said plurality of said pulses form partly overlapping unitary recording marks.

7. The method according to claim 5 wherein in response to a sequence of n+m consecutive bit cells of said first type, said radiation source is controlled so as to produce m+1 radiation pulses, which radiation pulses are spaced from each other by time intervals of one bit cell.

8. An apparatus for recording a binary information signal comprised of a sequence of bit cells with at least n consecutive bit cells of said sequence being of the same first type, on a record carrier having a radiation-sensitive layer, said apparatus comprising a radiation source, means for focusing radiation from said source onto the information layer of said record carrier and means for controlling said radiation source in dependence on the information signal so that upon occurrence of a sequence of m consecutive bit cells of said first type, said radiation source produces a radiation pulse of a duration and intensity such as to form on the information layer a unitary recording mark of a given configuration representing said sequence of m consecutive bit cells and upon occurrence of a sequence having a number of consecutive bit cells of said first type greater than m, said radiation source produces a plurality of consecutive radiation pulses such as to form a plurality of said unitary recording marks which are at least contiguous, wherein n and m are integers, $n \geq 2$ and $1 < m \leq n$.

9. The apparatus according to claim 8 wherein said controlling means supplies to said radiation source a control pulse upon occurrence of said sequence of m consecutive bit cells of said first type and supplies to said radiation source a plurality of said control pulses upon occurrence of a string having a number of consecutive bit cells of said first type greater than m, said radiation source producing said radiation pulses in response to said control pulses.

10. The apparatus according to claim 9 wherein upon occurrence of $n+m$ consecutive bit cells of said first type, said control means supplies $m+1$ control pulses which are spaced from each other by time intervals corresponding to one bit cell.

* * * * *